US010052769B2

(12) United States Patent
Houssin et al.

(10) Patent No.: US 10,052,769 B2
(45) Date of Patent: Aug. 21, 2018

(54) ROBOT CAPABLE OF INCORPORATING NATURAL DIALOGUES WITH A USER INTO THE BEHAVIOUR OF SAME, AND METHODS OF PROGRAMMING AND USING SAID ROBOT

(71) Applicant: SOFTBANK ROBOTICS EUROPE, Paris (FR)

(72) Inventors: David Houssin, Paris (FR); Gwennael Gate, Paris (FR)

(73) Assignee: SOFTBANK ROBOTICS EUROPE, Paris (FR)

( * ) Notice: Subject to any disclaimer, the term of this patent is extended or adjusted under 35 U.S.C. 154(b) by 0 days.

(21) Appl. No.: 14/390,746

(22) PCT Filed: Apr. 3, 2013

(86) PCT No.: PCT/EP2013/057043
§ 371 (c)(1),
(2) Date: Dec. 22, 2014

(87) PCT Pub. No.: WO2013/150076
PCT Pub. Date: Oct. 10, 2013

(65) Prior Publication Data
US 2015/0100157 A1    Apr. 9, 2015

(30) Foreign Application Priority Data
Apr. 4, 2012 (FR) ...................... 12 53073

(51) Int. Cl.
*G05B 19/04* (2006.01)
*B25J 11/00* (2006.01)
(Continued)

(52) U.S. Cl.
CPC .......... *B25J 11/001* (2013.01); *B25J 9/1694* (2013.01); *B25J 11/0005* (2013.01);
(Continued)

(58) Field of Classification Search
USPC .................................. 700/245–264
See application file for complete search history.

(56) References Cited

U.S. PATENT DOCUMENTS 6,731,307 B1 * 5/2004 Strubbe .................. G06N 3/004
704/E17.002
7,047,108 B1 * 5/2006 Rainier ................ G08B 13/194
318/800

(Continued)

FOREIGN PATENT DOCUMENTS

JP    2004-90109 A    3/2004
JP    2004-240150 A    8/2004
(Continued)

OTHER PUBLICATIONS

Yoshiaki Sakagami, et al., "The Intelligent ASIMO: System Overview and Integration", Proceedings of the 2002 IEEE/RSJ International Conference on Intelligent Robots and Systems, Sep. 30-Oct. 4, 2002, pp. 2478-2483, vol. 3, EPFL, Lausanne, Switzerland, XP010609464.

(Continued)

*Primary Examiner* — Bhavesh V Amin
(74) *Attorney, Agent, or Firm* — Baker & Hostetler LLP

(57) ABSTRACT

A humanoid robot is provided, the robot being capable of holding a dialog with at least one user, the dialog using two modes of voice recognition, one open and the other closed, the closed mode being defined by a concept characterizing a dialog sequence. The dialog may also be influenced by events that are neither speech nor a text. The robot is capable of executing behaviors and generating expressions and emotions. It has the advantage of considerably reducing programming time and latency of execution of dialog sequences, providing a fluency and naturalness close to human dialogs.

26 Claims, 12 Drawing Sheets

(51) Int. Cl.
*G10L 15/18* (2013.01)
*G10L 15/19* (2013.01)
*G06F 17/27* (2006.01)
*G06N 3/00* (2006.01)
*G10L 15/22* (2006.01)
*G06F 17/30* (2006.01)
*B25J 9/16* (2006.01)

(52) U.S. Cl.
CPC .... *G06F 17/2785* (2013.01); *G06F 17/30654* (2013.01); *G06N 3/008* (2013.01); *G10L 15/1815* (2013.01); *G10L 15/19* (2013.01); *G10L 15/22* (2013.01); *Y10S 901/46* (2013.01); *Y10S 901/47* (2013.01)

(56) References Cited

U.S. PATENT DOCUMENTS

| | | | |
|---|---|---|---|
| 7,076,331 B1* | 7/2006 | Nagatsuka | A63H 11/00 318/568.12 |
| 7,136,818 B1* | 11/2006 | Cosatto | G10L 15/1807 704/270.1 |
| 7,711,569 B2* | 5/2010 | Takeuchi | G06F 17/30654 704/1 |
| 8,473,449 B2* | 6/2013 | Visel | G06F 17/271 706/55 |
| 8,644,990 B2* | 2/2014 | Kim | B25J 9/1656 318/568.12 |
| 2001/0041980 A1* | 11/2001 | Howard | G10L 15/1822 704/270 |
| 2003/0152261 A1 | 8/2003 | Hiroe et al. | |
| 2004/0019485 A1* | 1/2004 | Kobayashi | G10L 13/033 704/260 |
| 2004/0249510 A1* | 12/2004 | Hanson | G06N 3/008 700/245 |
| 2006/0155765 A1* | 7/2006 | Takeuchi | G06F 17/30654 |
| 2008/0243750 A1* | 10/2008 | Kwok | G06N 7/005 706/59 |
| 2009/0164397 A1* | 6/2009 | Kwok | G06N 3/004 706/21 |
| 2010/0174546 A1* | 7/2010 | Kim | B25J 13/003 704/275 |
| 2011/0029128 A1 | 2/2011 | Serre et al. | |
| 2011/0071679 A1* | 3/2011 | Barajas | B25J 9/1674 700/259 |
| 2012/0022688 A1* | 1/2012 | Wong | G06N 3/008 700/253 |
| 2012/0197436 A1 | 8/2012 | Maisonnier et al. | |
| 2013/0103196 A1 | 4/2013 | Monceaux et al. | |
| 2013/0218339 A1 | 8/2013 | Maisonnier et al. | |
| 2015/0100157 A1* | 4/2015 | Houssin | G10L 15/1815 700/246 |

FOREIGN PATENT DOCUMENTS

| | | |
|---|---|---|
| JP | 2005-342862 A | 12/2005 |
| JP | 2007-17990 A | 1/2007 |
| JP | 2009-122598 A | 6/2009 |
| WO | 2009124951 A1 | 10/2009 |
| WO | 2009124955 A2 | 10/2009 |
| WO | 2011003628 A2 | 1/2011 |
| WO | 2012000927 A1 | 1/2012 |
| WO | 2012010451 A1 | 1/2012 |

OTHER PUBLICATIONS

Hartwig Holzapfel, et al., "A Dialogue Approach to Learning Object Descriptions and Semantic Categories", Robotics and Autonomous Systems, Nov. 30, 2008, pp. 1004-1013, vol. 56, No. 11, Elsevier Science Publishers, Amsterdam, NL, XP025561295.
Mikio Nakano, et al., "A Robot That Can Engage in Both Task-Oriented and Non-Task-Oriented Dialogues", 2006 6th IEEE-RAS Internaitonal Conference on Humanoid Robots, Dec. 1, 2006, pp. 404-411, IEEE, XP031053052.
Peter Ford Dominey, et al., "Robot Command, Interrogation and Teaching via Social Interaction", 2005 5th IEEE-RAS International Conference no Humanoid Robots, Dec. 5, 2005, pp. 475-480, IEEE, Piscataway, NJ, USA, XP010880443.
"Modify Variable from C++", Chatbots.org., Dec. 14, 2011, URL:http://web.archive.org/web/20120203055815/http://www.chatbots.org/ai_zone/viewthread/747/, XP002696066.
Rainer Bischoff, et al., "HERMES—a Versatile Personal Robotic Assistant", Proceedings of the IEEE, Nov. 1, 2004, pp. 1759-1779, vol. 92, No. 11, IEEE, New York, USA, XP011121110.
"ChatScript project", SourceForge.net, Version 3.81, created Dec. 31, 2013, 3 pages.
English Translation of Japanese Office Action issued in Japan Patent Application No. 2015-503871 dated Jun. 6, 2017.

\* cited by examiner

ROBOT CAPABLE OF INCORPORATING NATURAL DIALOGUES WITH A USER INTO THE BEHAVIOUR OF SAME, AND METHODS OF PROGRAMMING AND USING SAID ROBOT

CROSS-REFERENCE TO RELATED APPLICATIONS

This application is a National Stage of International patent application PCT/EP2013/057043, filed on Apr. 3, 2013, which claims priority to foreign French patent application No. FR 1253073, filed on Apr. 4, 2012, the disclosures of which are incorporated by reference in their entirety.

BACKGROUND

The present invention belongs to the field of robot programming systems. More specifically, it can be used to equip a humanoid robot already equipped with an ability to execute behaviors with advanced capabilities of dialog with a human user. A robot may be described as humanoid the moment it possesses some attributes of appearance and functionalities of a human being: a head, a trunk, two arms, possibly two hands, two legs, two feet, etc. Within the context of the present invention, the most important humanoid characteristic is, however, the capability for oral expression in dialog with a human being, said capability having to be as coordinated as possible with the gestural and/or symbolic expression of the personality and emotions of the robot. It is conceivable that applications may be developed of the 'robot companion' type, i.e. a robot that is able to take on, notably on behalf of one or more human beings in a state of dependence, a number of support functions in daily life, while providing said human beings with a presence that may be considered as a quasi-equivalent substitute emotionally for the presence of a human personal assistant. For this, it is essential to develop the ability of said humanoid robots to hold a dialog with human beings in a manner as close as possible to human behavior. In particular, it is necessary that the robot can interpret questions or statements from the human being, and utter responses in conversational mode, with a wealth of expression corresponding to that of a human being and modes of expression that are in synergy with the types of behaviors and emotions that are normally those of a human being.

Initial steps in this direction have been accomplished thanks to the methods for programming humanoid robots of the Nao™ brand marketed by the applicant of the present patent application and disclosed in the international patent application published under No. WO2012/000927 relating to a player robot and in the international patent application published under No. WO2012/010451 relating to a humanoid robot equipped with a natural dialog interface.

However, the robots disclosed by these documents can only perform a limited and predetermined number of dialog elements, or at least, if it is wished to multiply said dialog elements to a diversity corresponding to the normal behavior of a human being, the combinatorics would quickly become inaccessible to one. To be able to provide notably support services to the aforementioned person, it is therefore necessary to equip humanoid robots with a richer conversational ability than that of robots of the prior art.

To do this, the present invention installs in said robot a conversational agent, voice recognition tools and tools for analyzing the behavior of human beings with whom the robot converses.

SUMMARY OF THE INVENTION

To this end, the present invention discloses a humanoid robot including: i) at least one sensor selected from a group including first sensors of the sound type and second sensors, of at least one second type, of events generated by at least one user of said robot, ii) at least one event recognition module at the output of said at least one sensor and, iii) at least one module for generating events towards said at least one user, a module for dialog with said at least one user, said dialog module receiving as input the outputs of said at least one recognition module and producing outputs to said event generation module selected from a group including speech, movements, expressions and emotions, wherein said robot further includes an artificial intelligence engine configured for controlling the outputs of the event generation module.

Advantageously, the control of the event generation module by the artificial intelligence engine is implemented according to a context of dialog and variables defining a current and a forecast configuration of the robot.

Advantageously, said at least one event recognition module receives inputs originating from at least two sensors belonging to at least two different types, and in that said at least one event generation module at the output of said dialog module is capable of producing as outputs events taking into account said inputs originating from said at least two sensors.

Advantageously, said at least one recognition module is capable of structuring the inputs into concepts according to a dynamic hierarchical tree.

Advantageously, an input in said at least one recognition module applies to text or voice inputs and activates a grammar in said dialog module.

Advantageously, an input in said at least one recognition module activates/deactivates recognition of said input.

Advantageously, said at least one recognition module includes a first and a second submodules, the first submodule operating on a closed list of words linked to at least one concept and the second submodule operating on an open list of words.

Advantageously, only one output from the first submodule is supplied to the dialog module.

Advantageously, only an output from the second submodule is supplied to the dialog module.

Advantageously, an output from the first submodule and an output from the second submodule are supplied together to the dialog module.

Advantageously, only an output from the first submodule is first supplied to the dialog module, said output from the first submodule being confirmed in the dialog module by an output from the second submodule.

Advantageously, none of the outputs from the first and second submodules generates output from the dialog module and said robot provides at least one input to said at least one user.

Advantageously, the dialog module further receives as input dynamic elements originating from an application.

Advantageously, at least one output from the dialog module is supplied to a module capable of performing a function selected from a group of functions for generating at least one expression of said robot, for deciding to generate at least one behavior of said robot and for generating at least one emotion of said robot.

Advantageously, said function for generating at least one behavior takes into account the system constraints of said robot.

Advantageously, said function for generating at least one emotion is capable of generating a series of predefined expressions between a neutral state and a predefined state in response to input events.

Advantageously, the humanoid robot of the invention further includes a visual recognition module, said module being capable of interpreting at least one sign from said at least one user as a beginning or an end of a dialog sequence.

Advantageously, said dialog module includes a submodule for lexical analysis and a submodule for interpreting the outputs of said lexical analysis submodule capable of generating concepts to which the words of the current dialog are linked.

Advantageously, said dialog module is capable of processing questions and commands from said at least one user relating to the state of the physical and/or logical system of same.

The invention also discloses a method of dialog between a humanoid robot and at least one user, including: i) at least one step of recognizing inputs originating from at least one sensor selected from a group including first sensors of the sound type and second sensors, of at least one second type, of events generated by said at least one user, ii) a step of generating events towards said at least one user, and, iii) a step of dialog with said dialog with said at least one user, said dialog step receiving as input outputs from said at least one recognition step and producing outputs to said step of generating events selected from a group including speech, movements, expressions and emotions, wherein said method further includes a step of controlling the outputs of the event generation module by an artificial intelligence engine.

Advantageously, the control of the event generation module by the artificial intelligence engine is implemented according to a context of dialog and variables defining a current and a forecast configuration of the robot.

Advantageously, said robot holds a dialog with at least two users, parameters characterizing said at least two users being stored in a memory of said robot for being used when said robot recognizes one of the at least two users.

The invention also discloses a computer program embedded in a humanoid robot including program code instructions for executing the method of the invention, when the program is executed on a computer, said program being suitable for managing a dialog between said humanoid robot and at least a user, said computer program including: i) at least one module for recognizing events at the output of at least one sensor selected from a group including first sensors of the sound type and second sensors, of at least one second type, of events generated by said at least one user, ii) at least one module for generating events towards said at least one user, and, iii) a module for dialog with said at least one user, said dialog module receiving as input outputs from said at least one recognition module and producing outputs to said module for generating events selected from a group including speech, movements, expressions and emotions, said program being characterized in that it further includes an artificial intelligence engine configured for controlling the outputs of the event generation module.

Advantageously, the invention also discloses a computer program including program code instructions configured for generating the computer program according to the invention and transmitting said computer program to at least one humanoid robot, said instructions being generated on a ChatScript type interface.

The invention allows the use of programming languages already in use in the field of conversational agents, the syntax of said languages being already known to a large community of programmers who will thus be available for developing new applications implementing the present invention. Implemented as part of the present invention, the prior art conversational agents see their possibilities considerably increased thanks to the incorporation of advanced functionalities of speech recognition, as well as the taking into account of information originating from other sensors of the robot, notably of visual recognition, enabling it to detect situations of activation of dialogs and the interlocutors of same. A dialog according to the method of the invention may be adapted to different categories of elements of conversation with different robot personalities which will depend on the preferences of the user thereof. The robot will be able to express emotions in line with said elements of conversation have behaviors also synchronized with said elements, which will enable the creation of fluent scripts of exchanges between a user and the robot or robots of same. Furthermore, the robot will be able to provide information on the state of a number of elements of its system (remaining battery life, for example) and receive system commands in a dialog mode with a user, greatly improving the ergonomics of use of said robot.

BRIEF DESCRIPTION OF THE DRAWINGS

The invention will be better understood and the various features and advantages thereof will emerge from the following description of several examples of embodiment and their accompanying figures, of which.

DETAILED DESCRIPTION

Figure 1:
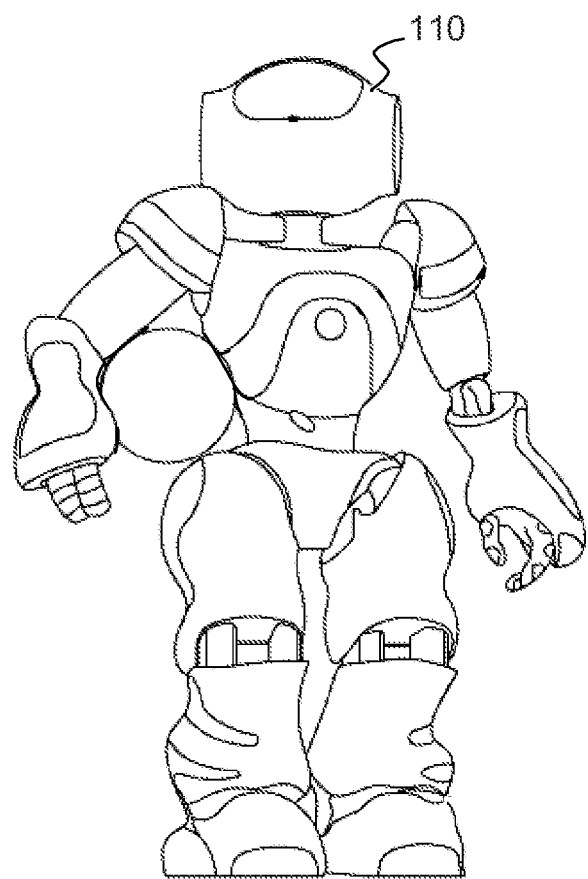
FIG. 1 depicts a humanoid robot capable of implementing the invention in several of the embodiments thereof.

FIG. 1 depicts a humanoid robot capable of implementing the invention in several of the embodiments thereof.

This humanoid robot is depicted in the figure in an embodiment of the invention. Such a robot has been disclosed notably in patent application WO2009/124951 published on Oct. 15, 2009. This platform is used as the basis for the improvements that have led to the present invention. In the rest of the description, this humanoid robot may be either referred to under this generic name or under its trademark NAO™, without affecting the generality of the reference.

This robot includes about two dozen electronic control boards for sensors and actuators that control the joints. The electronic control board comprises a commercially available microcontroller. This may, for example, be a DSPIC™ from the company Microchip. This is a 16-bit MCU coupled to a DSP. This MCU has a servo loop cycle of one ms. The robot may also comprise other types of actuators, notably LEDs (Light Emitting Diodes), the color and intensity of which can reflect the emotions of the robot. It may also comprise other types of position sensors, notably an inertial unit, FSRs (floor pressure sensors), etc.

The head 110 comprises the robot's intelligence, notably the board that performs the high-level functions that enable the robot to accomplish the tasks assigned to it, notably, in the context of the present invention, for the execution of dialogs written by a user. The head advantageously will also include specialized boards, notably in speech (synthesis and recognition) or vision processing.

Figure 9:
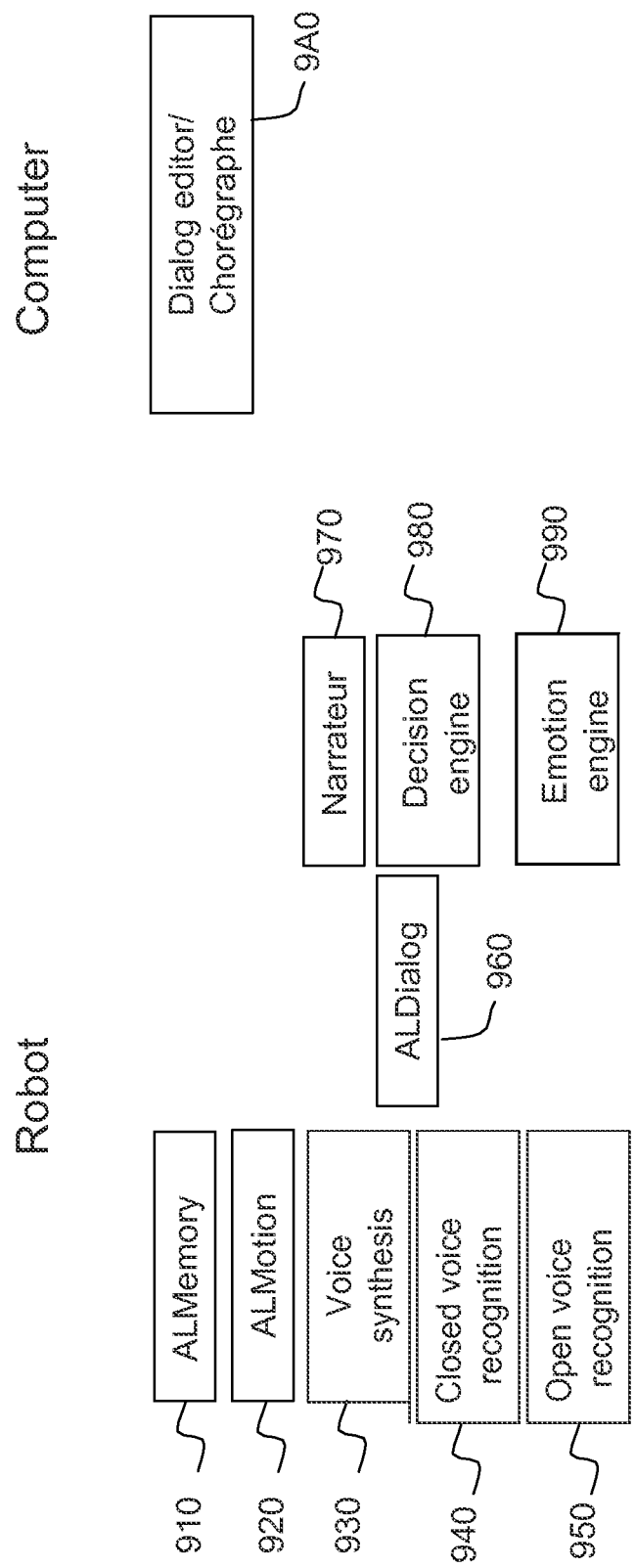
FIG. 9 depicts the architecture of the software modules installed on a robot configured for implementing the invention in several of the embodiments thereof.

With regard to speech recognition, in the audio signal processing architecture currently used, said audio signals are captured by four microphones and processed by software in specialized modules which are described in the comments on FIG. 9. The direction of origin of sounds can be determined analyze the differences in date of arrival of the sound signals at the four sensors. Speech is recognized by voice recognition software with a grammar engine (e.g. of the type marketed by the company Nuance™) or with a natural language interpreter.

The head also comprises one or more boards specialized in the processing of service inputs/outputs, such as the encoding required to open a port for establishing a remote communication over a Wide Area Network (WAN). The board processor may be a commercially available x86 processor. A low consumption processor will preferably be selected, e.g. an Intel ATOM™ (32-bit, 1600 MHz). The board also comprises a set of RAM and flash memories. This board also handles the robot's communication with the outside (behavior server, other robots, etc.), normally over a WiFi or WiMax transmission layer, optionally over a public mobile data communications network with standard protocols optionally encapsulated in a VPN. The processor is normally controlled through a standard OS that allows the use of conventional high-level languages (C, C++, Python, etc.) or specific artificial intelligence languages such as URBI (specialized robotics programming language) for programming high-level functions.

The robot will be able to perform behaviors for which it may have been programmed in advance, notably by a code generated according to the invention disclosed in the international patent application published under No. WO2012/010451 already cited, said code having been created by a programmer on a graphical interface. According to this invention and in the rest of this description, a behavior is a combination of actions (movements, speech) and optionally events. These behaviors may also have been arranged in a script created by a user who is not a professional programmer by using the invention disclosed in patent application WO2011/003628. In the first case, it may involve behaviors joined together in a relatively complex logic in which the sequences of behaviors are conditioned by the events that occur in the environment of the robot. In this case, a user who must have a minimum of programming skills may use the Chorégraphe™ toolkit, the main procedures of which are described in the cited application. In the second case, the sequential logic of the script is not in principle adaptive.

According to the present invention, a programmer is able to produce a complex script including sets of behaviors including various gestures and movements, utterances of sound or visual signals, and especially natural dialogs between the robot and a human being or another robot, said dialogs being coordinated with the personality and emotions of the robot and the semantic and event context of the conversation.

Figure 2:
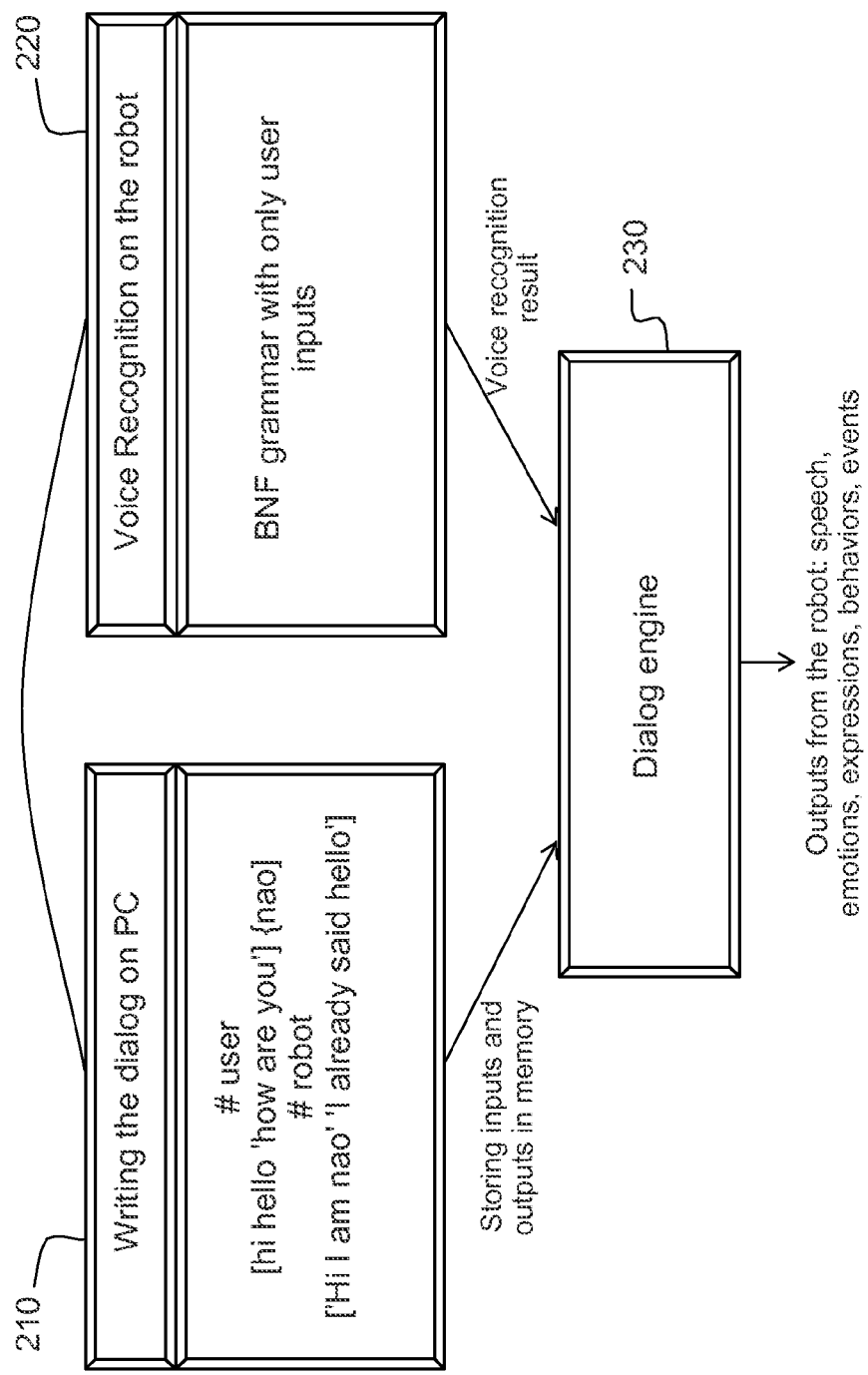
FIG. 2 depicts a general flowchart of the processing according to several embodiments of the invention.

FIG. 2 depicts a general flowchart of the processing according to several embodiments of the invention.

According to the invention, a module 210 for writing dialogs installed on a workstation, e.g. a PC, separate from the robot is intended for programming dialog scripts. Said dialogs may have several characters, one or more robots and one or more speakers. Said module is advantageously installed in the Chorégraphe™ software toolkit which can be used to program the behaviors of the robot, the dialogs being mixed within scripts with behaviors to be performed by the robot in relation to the elements of the dialogs. A voice recognition module 220 the features of which have been mentioned in the comments on FIG. 1 is installed on the robot. It is intended for interpreting the elements of the dialogs created in the module 210 for writing dialogs, said dialog elements being transmitted to the robot via a wired or wireless communication interface, according to the procedures described above in the comments on FIG. 1. The dialog elements sent to the module 220 are compiled, for example, in a language using the BNF (Backus Normal Form) standardized syntax. For example, a series of words will be interpreted as a logical 'AND', a logical 'OR' having to be symbolized differently, e.g. by a '|'. The operation of the voice recognition module 220 is further detailed in the description in the comments on FIG. 5.

Elements originating from the module 210 for writing dialogs and the outputs from the voice recognition module 220 are passed to a dialog engine module 230. Said engine generates speech, emotions, expressions, behaviors and events created in the module 210, according to the procedures explained in the comments on FIGS. 6 and 7. A behavior is a series of gestures defining a compound movement (stand up, play football, etc.). An expression is a behavior of a particular type defined for a dialog given by a speech/action pair. An action may be a combination of movements and/or signs issued, for example, by the robot's LED. A method for creating scripts consisting of series of expressions has been disclosed by the international application published under No. WO2011/003628. An emotion is a series of expressions defined by a terminal expression and a series of expressions that tend toward the terminal expression. By way of an example, the following emotions $E_{i,n}$ may be defined: 'happy/sad', 'tired', 'scared', 'excited', 'curious', each expression $E_{i,n}$, for i varying from 1 to n being an intermediate expression between a reference state and the expression $E_{n,n}$. If the robot is in a state $E_{j,p}$ p differing from n, a list of events defined for causing the emotion n will move the robot from the state $E_{j,p}$ to a state $E_{j,n}$.

The dialog description language is derived from the ChatScript language (http://chatscript.sourceforge.net/).

In the ChatScript syntax, a script is written like a set of rules. For example:
?: MEAT (you like meat) Yes
A complete rule generally includes:
  a kind, '?:' in the example, which indicates a question;
  a label, 'MEAT' in the example, which can be omitted, but which, when present, allows calls by other dialogs;
  an input characterized by a pattern shown between parentheses, '(you like meat)' in the example, a phrase to which the phrases will be linked which include these three words in this order, but also other words: 'Albert, you like meat', 'Albert, you like red meat', etc.;
  an output, 'Yes' in the example According to the invention, the language is adapted for mixing the dialog elements with robot behaviors. Non-restrictive examples of adaptation are given in the rest of the description.

For example, a behavior will be defined by a unique string of characters (e.g.: 'chess', 'football', 'tai-chi', etc.). An emotion also, it being understood that a code will indicate that it is an emotion (for example, an upper case initial letter can be used: 'Happy/Sad', 'Tired', 'Scared', 'Excited', 'Curious', etc.). The language used allows several wordings for a user phrase to be simply written (different wordings of 'hello', for example). An input may be a phrase of the entity holding a dialog with the robot (a 'user' which may be a human being or another robot), an event or both (I say hello extending a hand toward the robot). For one user phrase, this language can be used to express several possible responses in the form of phrases, emotions, events or behaviors. A dialog behavior may, for example, be of the type in which the robot follows the user with its eyes and analyzes the user's movements to create more natural responses (e.g. not speaking at the same time as the user).

Each element of the dialog language is retranscribed into its equivalent in the module 220 including the voice recognition engine, said engine being capable of recognizing only a limited number of words with certainty. Thanks to this conversion, it is ensured that each recognized phrase has a response. In writing dialog, not in execution, all the dialogs and all the dialog inputs are thus generated in voice recognition format. It is therefore important that the dialog description language has an equivalent in voice recognition, which is not the case for a keyboard dialog which is the known context of use of the ChatScript language.

Figure 3:
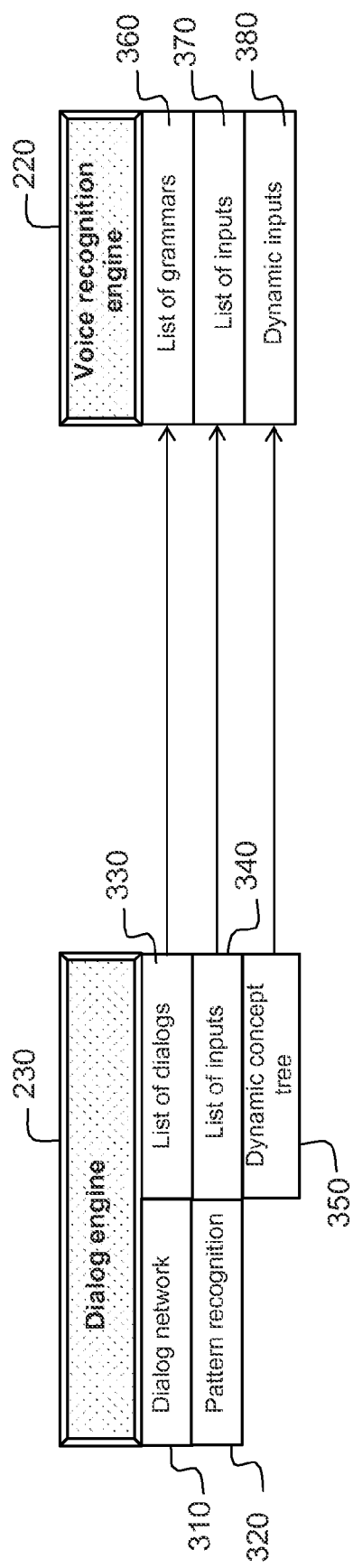
FIG. 3 depicts the processing units of a module for managing a dialog behavior and a voice recognition module according to several embodiments of the invention.

The grammar of the dialog description language notably comprises the following functionalities:

1) Pattern recognition (or pattern matching):
  Some patterns are indicated in the dialog script by a sign:
    'Or' accepts a list of possible words, e.g.: [hi hello];
    'And' searches an exact list of words, e.g.: 'I'm happy';
    Optional words, e.g.: hi {'my robot'};
    Banned words, e.g.: I'm !not happy; the word not does not confirm the input;
    Unknown words, e.g.: my name is *; the name of the user is not known;
2) Context in a dialog; moving from one dialog to another using trigger phrases, e.g.:
    Ut: (speaking of an automobile); this phrase will trigger the dialog
      on automobiles;
3) Subdialog; a subdialog is activated on certain phrases and may follow on in series, e.g.:
    U: (how are you?) I'm fine and you?
      A: (I'm not well) oh why?
        B: (I'm sick) Oh too bad, do you want any medicine?
      A: (I'm fine) great
This subdialog functionality may, for example, give rise to a dialog of the type:
Human: How are you?
Robot: I'm fine and you?
Human: I'm not well
Robot: oh, why?
Human: I'm sick
4) Events:
Taking into account events as input for a dialog in the same way as the speech captured by the robot gives the conversational agent of the invention potentialities that do not exist in the prior art. In particular, the visual recognition of the robot enables it to detect a person in its environment and to say hi, as would be the case when the person speaks to it:
    U: ([e :faceDetected hi]) hi there
      If the robot sees a person or if someone says 'hi', then the robot responds 'hi there'.
An event may also be triggered as the output of a dialog, optionally by starting an application:
    U: (I'm hungry) $userstate='hunger'
      $userstate='hunger' will assign both hunger to userstate and start an event [userstate,hunger] to which an application may be connected;
5) Selection of implicit or explicit behaviors:
    U: (Do you recognize me?) [$faceRecognized==' run :faceRecognition I don't recognize you but I will remember you
      the next time]
6) Proposals; when the robot does not understand or misunderstands what the user says, then it uses a standard dialog proposal in order to clarify this, e.g.:
    Proposal: how old are you?
    U: (I am [5 6 7 8]) you're young!
7) Variables; the dialog may store user information, e.g.:
    U: (I am _[5 6 7 8]) $age = $1 you're young!
8) Dynamic elements; variables and lists (mp3s, applications, preferences, etc.) may be integrated into the dialog as input and as output, e.g.:
    U: (what can you do?) I can ~applications
    U: (what is your name?) my name is $name
    U: ({start read tell} * _ ~ application) ok I'll begin $1
    $application may be e.g. ('three musketeers', 'le monde')
9) Emotions, SAD, HAPPY, CURIOUS, SCARED, TIRED, i.e.:
    U: (I don't love you!) that makes me sad SAD
10) Deletion rules; an input may be deactivated or activated in order to avoid a phenomenon of repetition in the responses; the same input may thus be repeated in the dialog or in several dialogs, the deletion rules will enable all the inputs to be interpreted, e.g.:
    U: delete (how are you) I'm fine
    U: (how are you nao) you remember my name! I'm fine
    U: (how are you) as I was just now
11) Response rules; several possible outputs may be produced by the robot the selection from which is determined by the inputs that it receives from the user or users deterministically (always the same output, or the output of a given rank in the list, whatever the input), randomly, sequentially (the input i+1 triggers the output j+1 if the input i triggers the output j) or conditionally. The dialog module has access to all of the robot's memory, and can therefore give a response according to values in the robot's memory; outputs may be deleted after being used to add variety to the dialog; by way of example:
    U: (how are you) ['I'm fine' 'I already told you'] # sequential by default
    U: (How are you) ^random ['I'm fine' 'I'm very well' 'I'm great']
    U: (what is your name) ^first ['my name is $name' I have no name'] # Here 'my name is $name' is only displayable if $name exists.
    U: (how are you) ^delete I'm fine   # delete the rule after displaying the response
12) Start a subdialog, topic:
    U: (I want to talk about automobiles) topic :automobiles FIG. 3 depicts the processing units of a module for managing a dialog behavior and a voice recognition module according to several embodiments of the invention.

When a dialog is executed by the runtime embedded in the robot, the dialog engine 230 acts both on the network and the dialog lists 310, 330 and on the voice recognition 220.

The dialog network 310 is the structured set of dialogs that indicates how to join them together: first an introduction then another dialog, for example. The network gives a direction to the dialogs. List 330 is the unstructured list of active dialogs which is present in both the dialog engine and in the voice recognition engine.

A dialog may be activated or deactivated (which simultaneously affects all the inputs 340 thereof). Activating/deactivating may be triggered automatically by a trigger (ut:) or manually by a user. Minimizing the number of active dialogs at a given moment can be used to optimize voice recognition performance in 'in terms of' quality and processing time. The parameters of the dialogs can be set in the editor so that they remain active even in the event of opening a new dialog, the default solution being that the opening of a new dialog closes the previous dialog. A dialog input may also be activated/deactivated individually, either by connecting to a subdialog or by deletion performed for avoiding a repetition of a dialog element in progress. The dialog engine 230 includes a pattern recognition module 320 the operation of which was illustrated in the comments on FIG. 2 (point 1). It also includes a dynamic concept tree 350.

A concept is a list of words that are defined as semantically equivalent in a given dialog. As an example, the phrase 'I live' is considered in a given dialog as semantically equivalent to the phrases 'I am living' 'I reside' 'I live', 'me, I'm living' 'me, I reside' 'me, I live' etc. A concept (to live) and a concept (I) will therefore be defined:

Concept: (to live) (living reside live to_live to_reside)
Concept: (I) (me I I've)

The phrase will therefore be written in several places in the dialogs:

U: (~I ~to_live)

A dynamic concept tree includes a plurality of hierarchically organized concepts. It will also be possible to modify the list of phrases linked to a concept at execution.

As an example, the concept 'food' includes the concepts 'fruit' and 'meat' and the concept 'fruit' includes 'banana' and 'orange';

Concept: (food) (~fruit ~meat)
Concept: (fruit) (banana orange)

It will be possible to add new fruits during the dialogs. The following dialogs may thus be created:

U: (do you know _ {of the}_~food) yes I know $1 $2
Which gives the execution:
User: do you know the banana?
Robot: yes I know the banana
U: (name me a fruit) ~fruit is a fruit
User: name me a fruit
Robot: banana is a fruit The input in a dialog of the list 330 activates a grammar in the list of grammars 360 of the voice recognition module 220. The list of inputs 370 of the voice recognition module is activated/deactivated in a synchronized manner with the list of inputs 340 of the dialog module. Modifying a concept in the dynamic concept tree 350 of the dialog module 230 leads to an adaptation of the dynamic inputs 380 of the voice recognition module.

Figure 4:
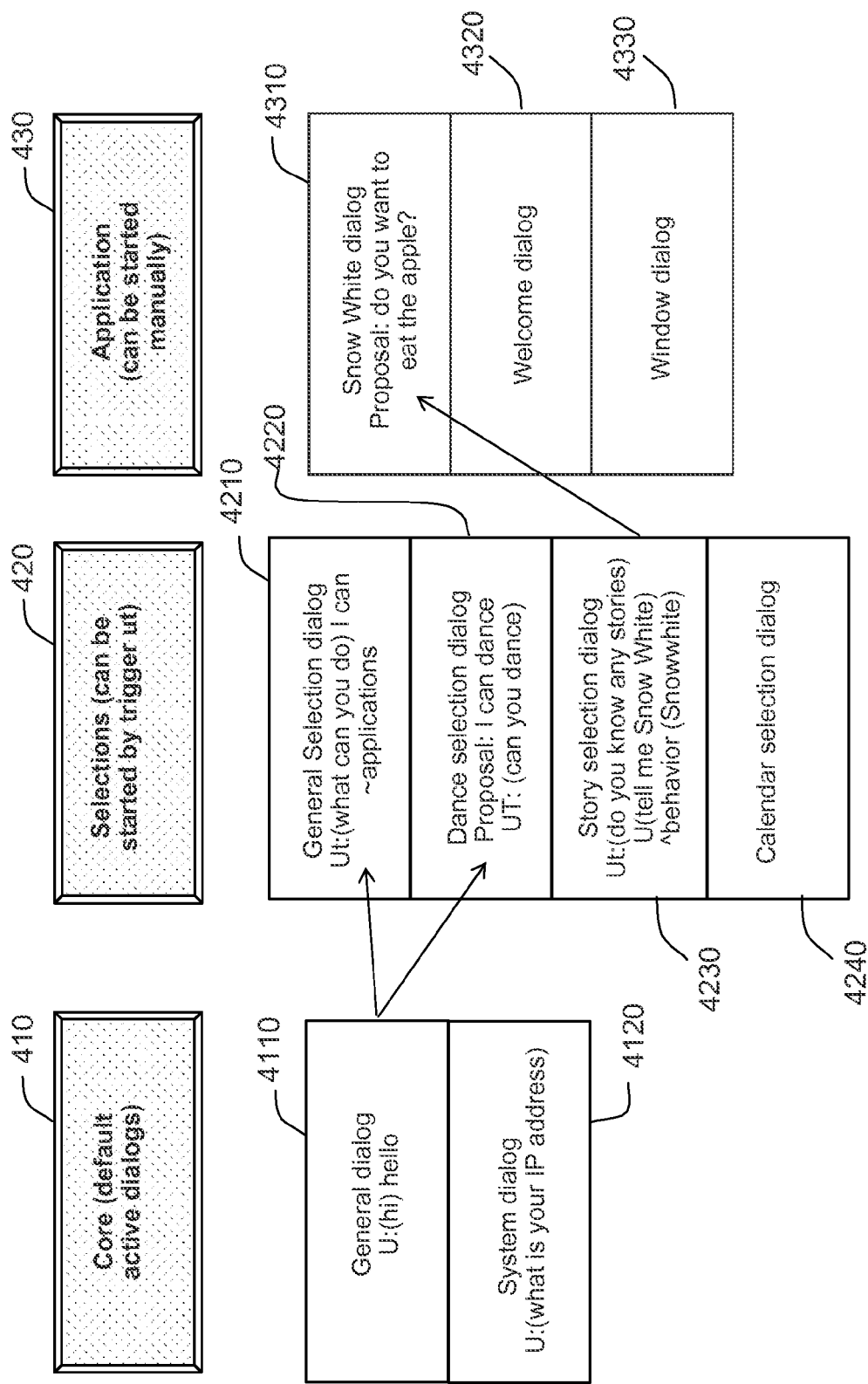
FIG. 4 depicts an example of a tree structure of several levels of dialog according to several embodiments of the invention.

FIG. 4 depicts an example of a tree structure of several levels of dialog according to several embodiments of the invention.

Several dialogs are shown in the figure. They may run in parallel (with a priority stack), one dialog being able to replace another.

A dialog includes three logical levels in the dialog engine module 230 embedded in the robot:

A level 410 including the active dialogs by default: general dialogs 4110 (greeting, presentation, mood) and one 'system' dialog 4120 for revealing the state of the robot (battery, temperature, configuration, etc.) or giving basic commands (stand up, walk, etc.); the possibility not only of obtaining information on the state of the vital functions of the robot, but of being able to control some of them (put in standby mode, connect to a power outlet, etc.) can be used to lower the psychological barrier felt by non-technical users in their confrontation with robots;

A level 420 including the routines for selecting dialogs according to inputs from the user, said selection able to be triggered by a trigger Ut:; multiple selections 4210, 4220, 4230, 4240, for example, can be programmed;

A level 430 including applications 4310, 4320, 4330, for example, which are sequences of dialogs or files and are capable of being started automatically or manually by a user.

By default a dialog containing general information and system commands ('speak louder', for example) are loaded. Trigger phrases can then trigger the loading of other dialogs, e.g. for:

Changing the subject of discussion (speaking of automobiles, the day's activity, etc.);

Explaining what the robot can do ('I can tell a story'); this part contains dynamic elements: installed mp3s, installed applications; any application that can be started through voice recognition should contain information: its theme (game, information, etc.) and optionally a dialog specifying the application (the robot may say that Alice in Wonderland is a story about a little girl, etc.);

Starting the dialog of an application (e.g. an interactive story)

A choice may be offered: guess a famous person, select a behavior, choose a product, find a person in a business, etc. The choice may be made either by the robot (the human must understand what the robot means) or by the human (the robot must understand the robot's choice).

This choice may be made with a dialog as described above but this dialog involves often repeating the same phrases which makes the dialog difficult to write:

---

U: (guess who I'm thinking of) is it a man?
A: (yes) is it a woman?
B: (yes) etc.
B: (no) etc.
A: (no) is it a fictional character?

---

The notion of concept is used to navigate a tree of possibles. A concept is a word related to other words, phrases or concepts.

Concept: (man) ['he breathes' 'it is a human being']
Concept: (superman) [~man superhero ~flies ~cape]
Concept: (halliday) [~singer ~man]
Concept:: (all) [~superman ~halliday]

Figure 4A:
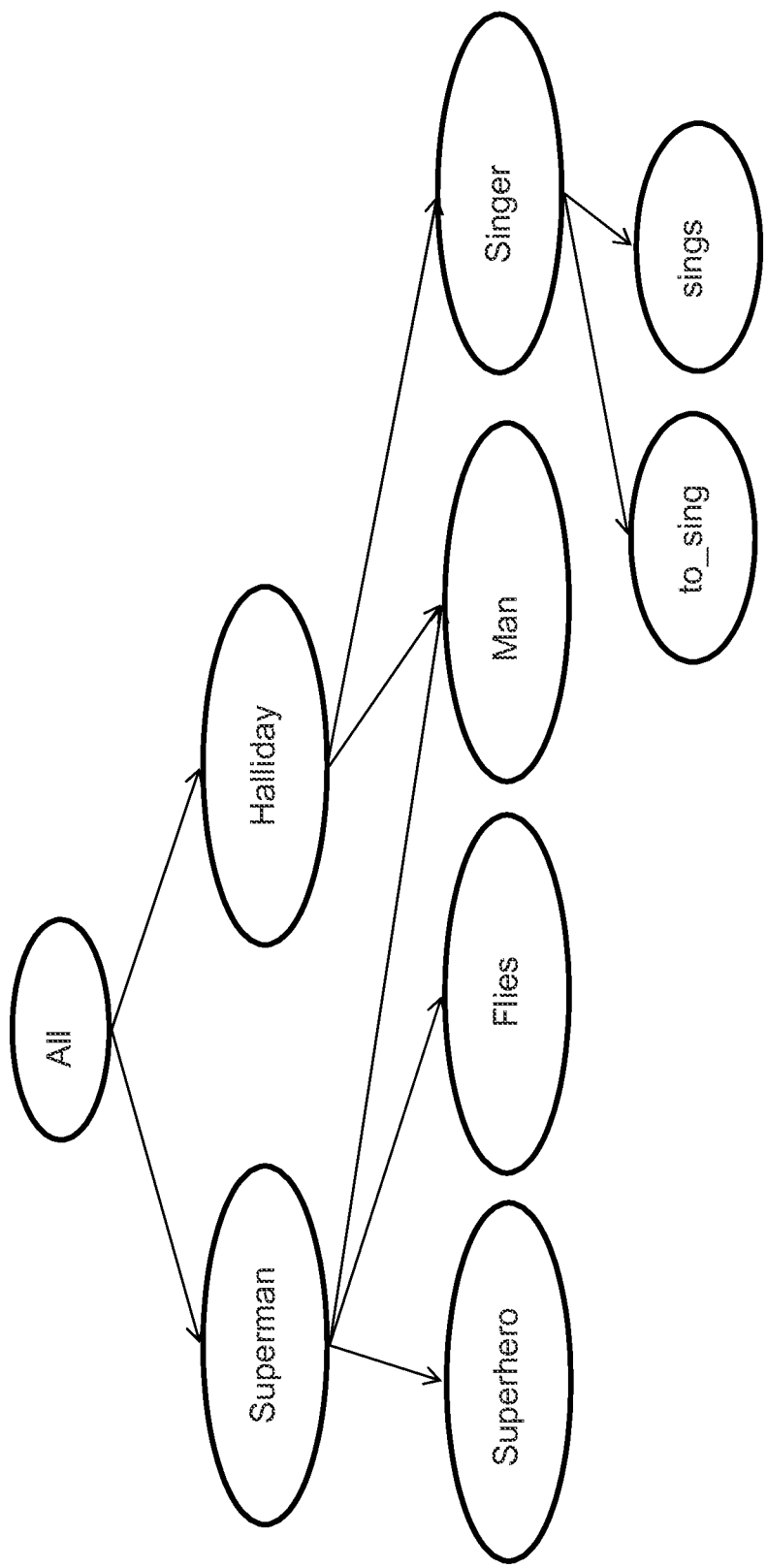
FIG. 4a depicts a concept tree according to several embodiments of the invention.

The hierarchical nature of the tree of possibles is illustrated in FIG. 4A for the example above.

Words represent the leaves of the tree. Concepts represent the nodes of the tree. Nodes and leaves are elements of pattern matching (pattern recognition).

With a single input:
U: (['can he' 'is it' ~superman) yes
We could match:
Can he fly
Is it a man
Is it superman
We could also suggest:
U: (help me) ~superman Here one of the leaves of the tree is displayed.
User: help me
Robot: it breathes.
For the human to guess superman, it is sufficient to write:
U: (is it superman?) yes you have got it!
U: (~superman) yes
Proposal: no, it's not him.
For the robot to guess a character, it is sufficient to write:
U: (guess who I am thinking of)? ~all FIG. 5 depicts a simplified flowchart of the processing of the voice recognition module in one embodiment of the invention.

Two levels of voice recognition are superimposed:
A first level 510 includes a limited number of recognizable words; the recognized words must appear in a closed list; examples of voice recognition software of this type are supplied by Nuance™ (brand name Vocon™), Acapella™ and, for software using a natural language, Dragon™;
A second level 520 of voice recognition is of the open type, i.e. the diversity of recognized words is much greater; examples of voice recognition software of this type are supplied notably by Nuance™ under the brand name NMSP™; this software can be used to manage words that are not known in advance which will be designated by a numbered joker $x.

A voice recognition architect of this type, including two levels, one closed 510 and the other open 520 (e.g. of the voice dictation type) can be used to optimize the recognition speed/quality pair.

Figure 5:
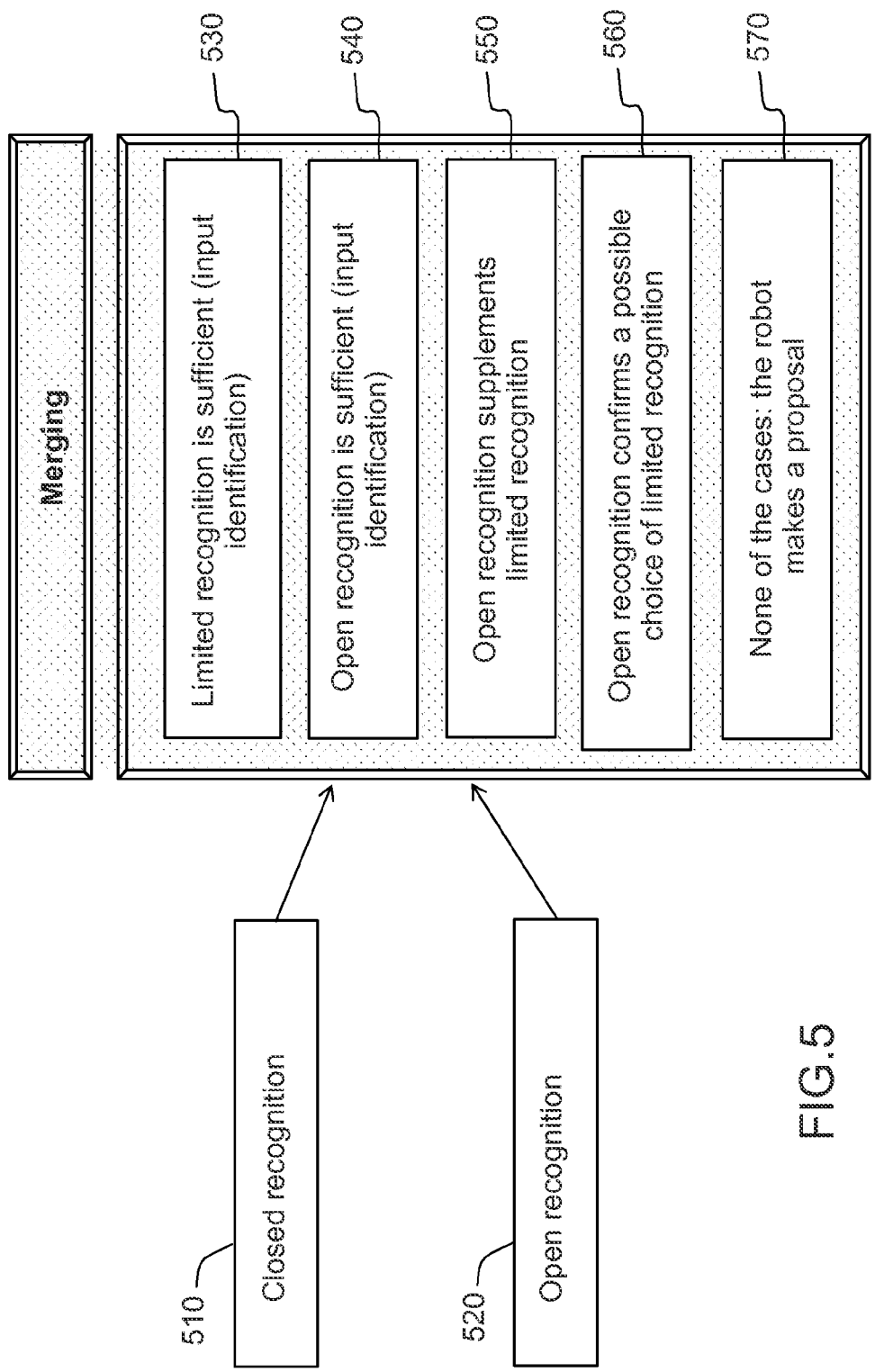
FIG. 5 depicts a simplified flowchart of the processing of the voice recognition module in several embodiments of the invention.

FIG. 5 illustrates how the two types of voice recognition are merged:
Case 530: the robot is in the same context as that of the user and what it says is recognized by limited recognition; then voice dictation is not necessary;
Case 540: the robot is not in the same context as that of the user (the user is speaking of an automobile but the robot thinks that they are speaking of food); then the phrases recognized by voice dictation may be closer to a dialog;
Case 550: recognition of type 520 supplements the recognition of type 510;
Case 560: open recognition confirms a possible choice of closed recognition;
Case 570: the robot does not understand what the user says; it makes a proposal for validating the field of the dialog or switches to another subject, the above cases 530-560 then being able to follow on from this restart by the robot.

Figure 6:
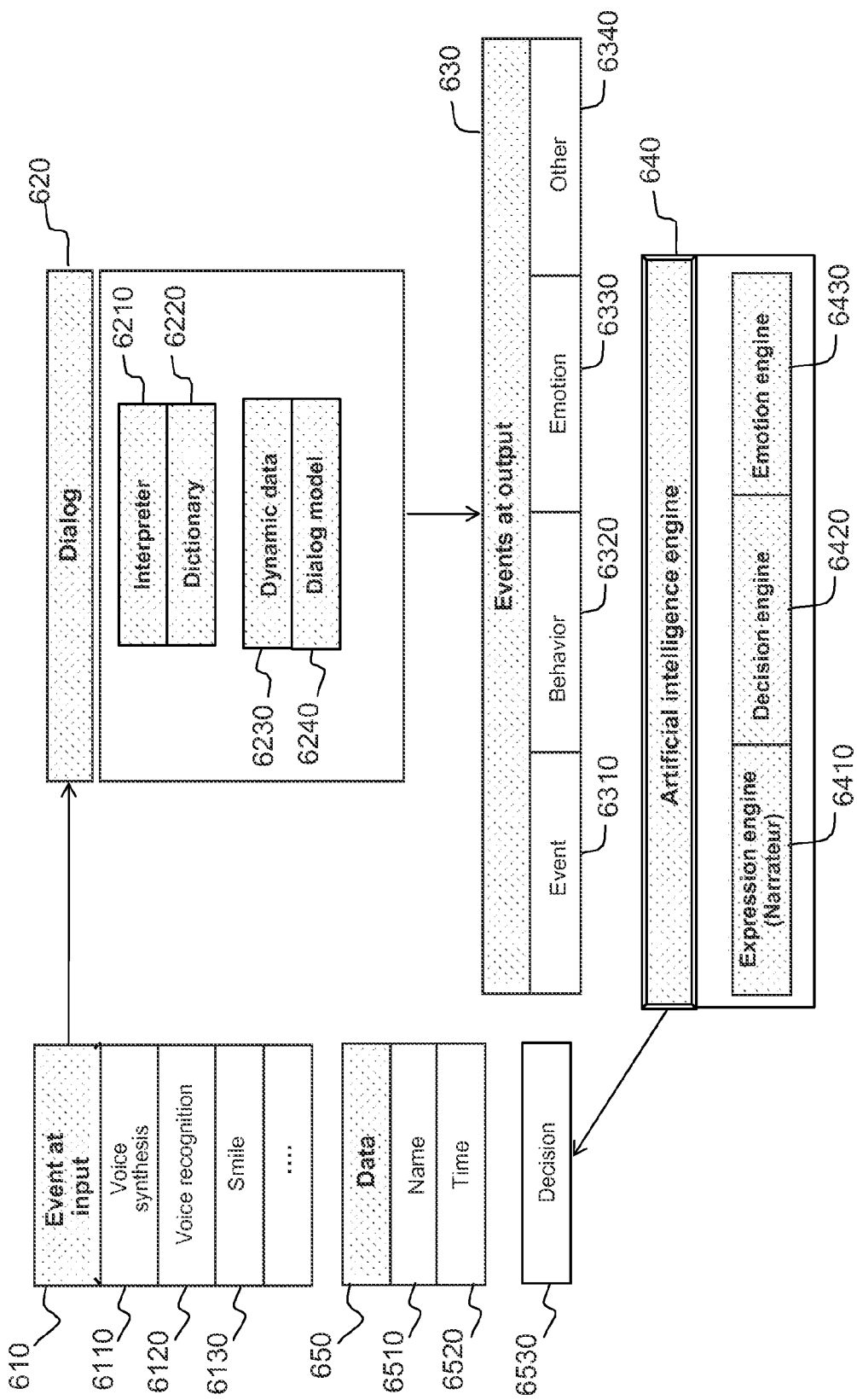
FIG. 6 depicts the data flow between several software modules configured for implementing the invention in several of the embodiments thereof.

FIG. 6 depicts the data flow between several software modules configured for implementing the invention in several of the embodiments thereof.

The figure shows the exchange of data between the input events 610, the dialog 620, the output events 630 and an artificial intelligence engine embedded in the robot 640:
The dialog 620 waits for input events (e.g. a smile 6130 or speech from the user 6120);
The dialog engine can dynamically load new dialogs 6240 or dynamic data 6230 (e.g. an mp3 file or an application installed on the);
It formulates its response in the form of expressive speech 6310, in other words, speech comprising information on how to interpret the text (a stage direction for the robot), behavior 6320, emotion 6330 or event 6340;
The outputs from the dialog may be sent to different artificial intelligence modules 640:
Speech and expressions are processed by an expression processing engine 6410, Narrateur, using movements and voice synthesis, as described notably in the international patent application published under No. WO2011/003628;
Emotions are processed by an emotion engine 6420 that develops the emotions of the robot for stabilizing them over time;
A decision engine 6430 decides on whether or not to start a behavior and may signal the decision to the dialog engine in the form of an event; the robot may refuse to stand up if the conditions are not satisfied for doing so.

This behavior may the choice to use voice recognition or keyboard input, as explained above in the comments on FIG. 4; the behavior triggers speech and the interruption of speech according to the actions of the user, e.g. opening the mouth, walking away, turning the head, etc.

The dialog includes an interpreter 6230 and a dialog model 6240.

A dialog model includes:
A dialog network and active dialogs;
All the dialog inputs and active inputs;
All the dialog outputs;
All the dialog proposals.

The references 6310, 6320, 6330, 6340 represent the outputs from the dialog engine in the form of events.

Figure 6A:
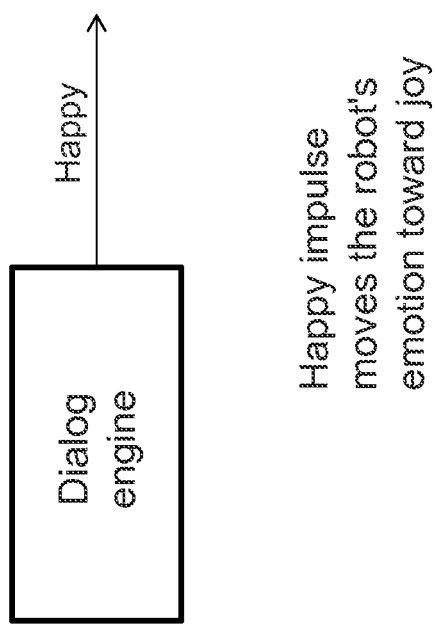
FIG. 6a illustrates the operation of an emotion engine in certain embodiments of the invention.
Figure 6A:
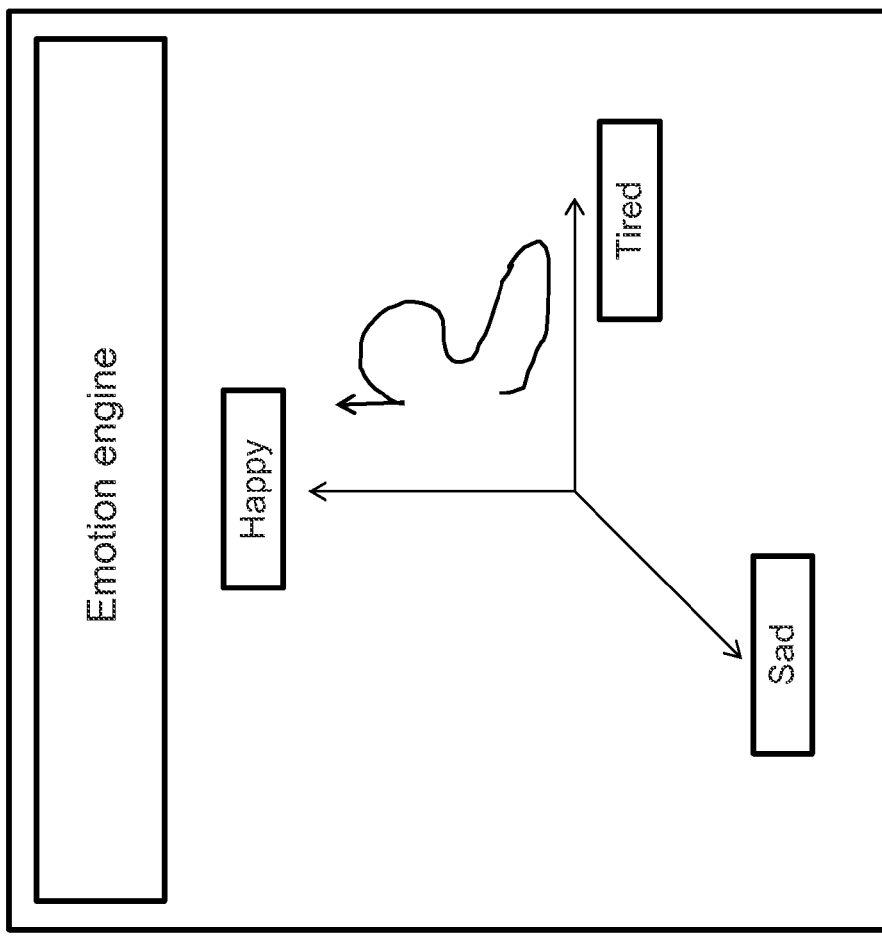

FIG. 6a illustrates the operation of an emotion engine in certain embodiments of the invention.

As explained above in the comments on FIG. 2, the emotion of the robot is a point in a multidimensional space of emotions (e.g. SAD, HAPPY, ANGRY, TIRED, etc.).

The dialog engine, but not only the dialog engine, for example, the battery state thereof, faces encountered and time are also a source of change of emotion, sends a pulse to the emotion engine which changes the robot's current emotion. This emotion stabilizes toward the neutral emotion (0,0,0,0,0,0) with time.

Figure 6B:
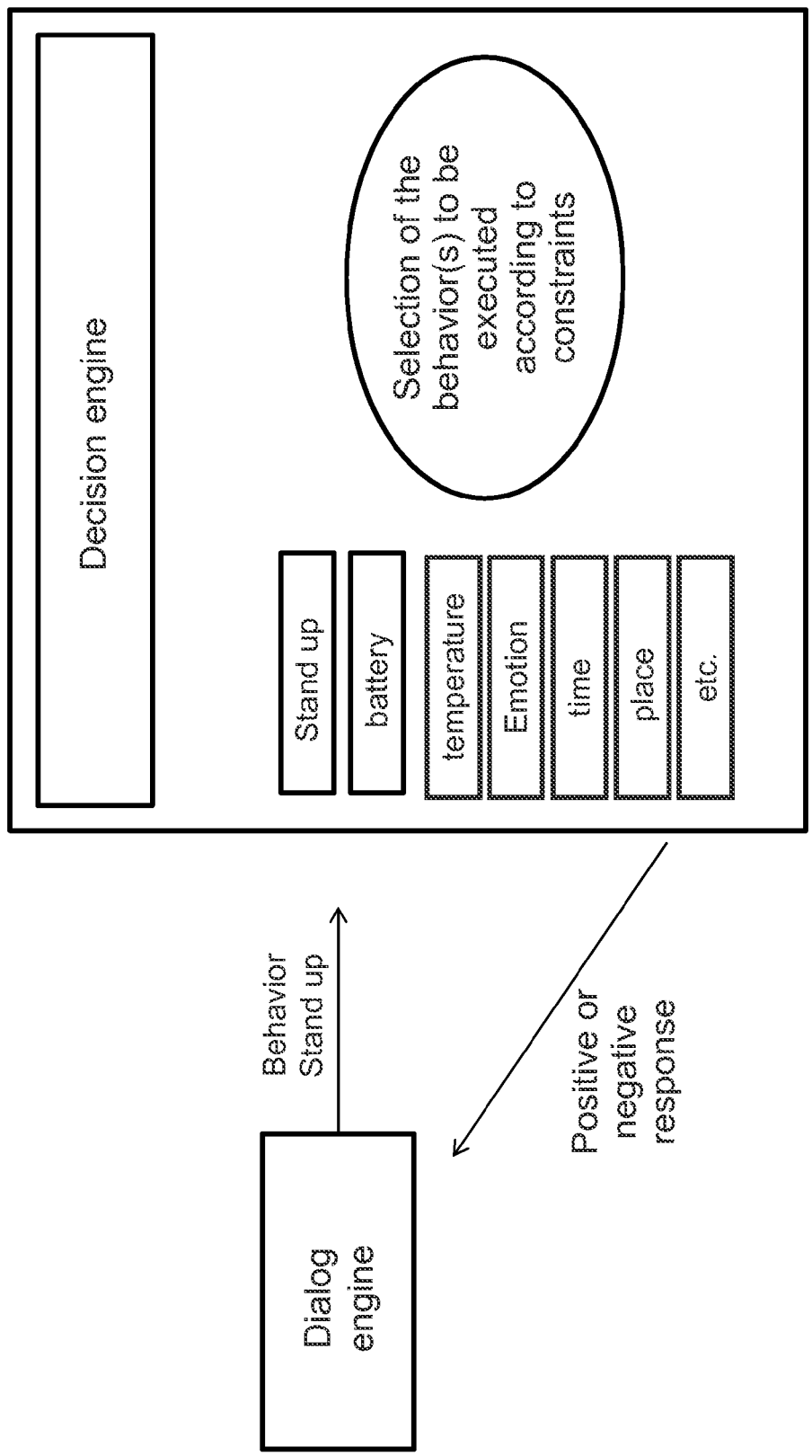
FIG. 6b illustrates the operation of a decision engine in certain embodiments of the invention.

FIG. 6b illustrates the operation of a decision engine in certain embodiments of the invention.

The decision engine takes into account all requests for executing behaviors and all the constraints of the robot in the form of available resources. A request for executing the dialog engine is only one element of the decision. All the variables/events of the robot participate in the decision (battery, temperature, emotions, etc.).

Figure 7:
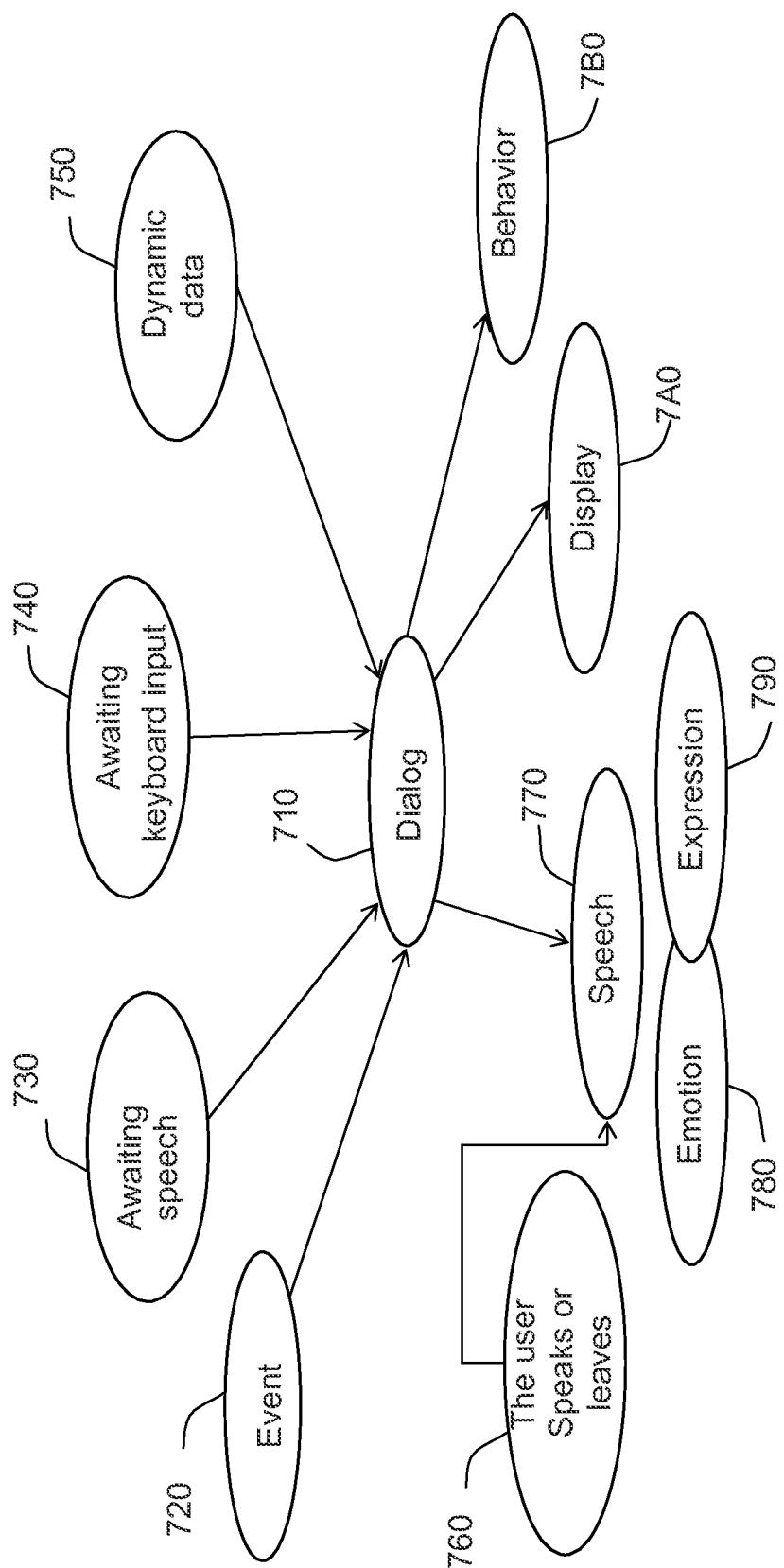
FIG. 7 depicts the various functions at the input and at the output of the dialog management module for implementing the invention in several of the embodiments thereof.

FIG. 7 depicts the various functions at the input and at the output of the dialog management module for implementing the invention in several of the embodiments thereof.

The figure illustrates that a dialog 710 equally takes as input the result of speech recognition 730, keyboard inputs 740 or events 720. Dynamic data 750, such as mp3 files or an application may also be taken into account. Advantageously, from processing the images received by a camera embedded in the robot, the dialog module analyzes the position of the head of the speaker(s) in order to know whether the robot is being addressed. Similarly, it can assess the positions of the lips in order to know whether or not the user is speaking and accordingly, if it must listen or if it can speak (element 760).

Also, face recognition can be used, in the same way as speech itself, to indicate the name of the current speaker.

A 'speech' response from the dialog engine may be given by the voice of the robot or on a screen 7A0 (or both).

As already mentioned, the dialog module is able to trigger the execution of behaviors (element 7B0).

Figure 8:
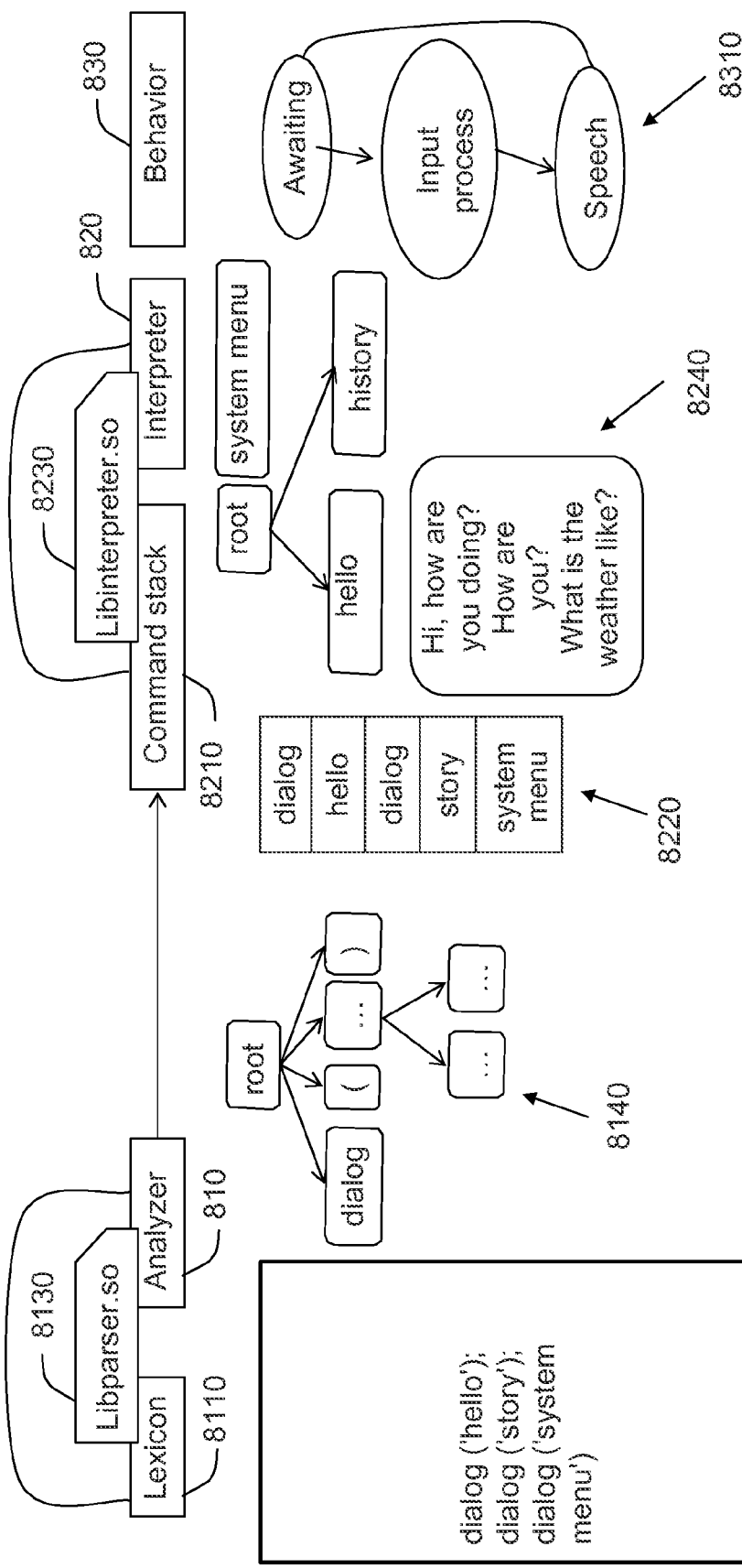
FIG. 8 depicts the data model of an analysis and dialog interpreting module for implementing the invention in several of the embodiments thereof.

FIG. 8 depicts the data model of an analysis and dialog interpreting module for implementing the invention in several of the embodiments thereof.

The analyzer 810 retrieves words from a lexicon 8110 in dialogs 8120 which are supplied thereto as input. The input dialogs have the data model 8140. 'Libparser.so' libraries 8130 for parsing the contents of the dialogs perform this function. This enables a dialog model and all the inputs from these dialogs to be built in memory for the interpreter 820. At execution, the interpreter maintains a stack 8210 of active dialogs together with all the active inputs for each user. The dialogs 'parsed' at the input of the interpreter have the form 8220 and the data model 8240. The interpreter comprises 'Libinterpreter.so' libraries 8240 for fulfilling the interpreting functions of same.

Indeed, standard concepts, variables and dialogs can be made dependent on the user.

Thus, the following rules can be used for changing user:
U: (e:faceRecognition) ($name=$faceRecognition)
U: (my name is _*) ($name=$1)
In this case the variables depending on the user (preferences, age, height, etc.) are automatically reset or assigned according to the history of the user.

The behaviors 830 have a data model 8310 for variables of state.

FIG. 9 depicts the architecture of the software modules installed on a robot configured for implementing the invention in several of the embodiments thereof.

A robot such as NAO is advantageously equipped with high level software for controlling the functions of the robot in one embodiment of the invention. A software architecture of this type, called NAOQI, has been disclosed notably in patent application WO2009/124955 published on Oct. 15, 2009. It comprises the basic functions for managing communications between a robot and a PC or a remote site and for the exchange of software supplying the necessary software infrastructure for implementing the present invention.

NAOQI is a framework optimized for robotic applications; it supports multiple languages, notably C++, Python, Urbi, Java and matlab.

In the context of the present invention the following NAOQI modules are particularly useful:
the ALMemory module, 910, manages a memory shared between the various NAOQI modules;
the ALMotion module, 920, manages the robot's movements;
the Voice synthesis module, 930, generates the robot's speech;
the Closed recognition module, 940, performs the functions of reference 510 in FIG. 5;
the Open recognition module, 950, performs the functions of reference 520 in FIG. 6;
the module ALDialog, 960, performs the functions of the dialog engine module of reference 230 in FIG. 2;
the Narrator [Narrateur] module, 970, performs the functions of reference 6410 in FIG. 6;
the Decision engine module, 980, performs the functions of reference 6420 in FIG. 6;
the Emotion engine module, 990, performs the functions of reference 6430 in FIG. 6;

These modules are advantageously coded in C++. The figure also shows the data flow between modules.

As mentioned in the comments on FIG. 2, the dialogs are generated in a dialog editing module 9A0 installed on a standard computer. They may also be generated in the Chorégraphe toolbox. Consistency is ensured between the dialogs of the ALDialog module 960 and those of the editing module 9A0. The data flow between the analyzer 810 and the interpreter 820 (which are shown in FIG. 8) of the dialog engine 960 takes place both on the computer at the time of editing and on the robot at execution.

The analyzer can read a dialog description file u: ( . . . )

The interpreter constructs, from the result of the analyzer (a dialog written without syntax error), the dialog model in memory.

The examples described above are given by way of illustration of embodiments of the invention. They do not limit in any way the scope of the invention which is defined by the following claims.

The invention claimed is:

1. A humanoid robot, comprising:
i) at least one sensor selected from a group comprising audio sensors and visual sensors of events generated by at least one user of said robot,
ii) at least one event recognition module at the output of said at least one sensor and,
iii) at least one module for generating events towards said at least one user, a module for dialog with said at least one user, said dialog module receiving as input the outputs of said at least one recognition module and producing outputs to said event generation module selected from a group including speech, movements, expressions and emotions, wherein said robot further includes an artificial intelligence engine configured for controlling the outputs of the event generation module according to a context of dialog and variables defining emotions of the robot as a series of expressions between a neutral state and a terminal state, an evolution between said neutral state and said terminal state being triggered by a pulse generated as a function of time and of one or more of the outputs of the at least a sensor, the event recognition module, the dialog module and the event generation module.

2. The humanoid robot of claim 1,
wherein said at least one event recognition module receives inputs originating from at least two sensors belonging to at least two different types, and said at least one event generation module at the output of said dialog module is capable of producing as outputs events taking into account said inputs originating from said at least two sensors.

3. The humanoid robot of claim 1,
wherein said at least one recognition module is capable of structuring the inputs into concepts according to a dynamic hierarchical tree.

4. The humanoid robot of claim 1,
wherein an input in said at least one recognition module applies to text or voice inputs and activates a grammar in said dialog module.

5. The humanoid robot of claim 4,
wherein an input in said at least one recognition module activates/deactivates recognition of said input.

6. The humanoid robot of claim 4,
wherein said at least one recognition module includes a first and a second submodules, the first submodule operating on a closed list of words linked to at least one concept and the second submodule operating on an open list of words.

7. The humanoid robot of claim 6,
wherein only one output from the first submodule is supplied to the dialog module.

8. The humanoid robot of claim 6,
wherein only an output from the second submodule is supplied to the dialog module.

9. The humanoid robot of claim 6,
wherein an output from the first submodule and an output from the second submodule are supplied together to the dialog module.

10. The humanoid robot of claim 6,
wherein only an output from the first submodule is first supplied to the dialog module, said output from the first submodule being confirmed in the dialog module by an output from the second submodule.

11. The humanoid robot of claim 6,
wherein none of the outputs from the first and second sub-modules generates output from the dialog module and said robot provides at least one output to said at least one user.

12. The humanoid robot of claim 1,
wherein the dialog module further receives as input dynamic elements originating from an application.

13. The humanoid robot of claim 1,
wherein at least one output from the dialog module is supplied to a module capable of performing a function selected from a group of functions including a function for generating at least one expression of said robot, a function for deciding to generate at least one behavior of said robot, and a function for generating at least one emotion of said robot.

14. The humanoid robot of claim 13,
wherein said function selected from the group of functions is said function for generating at least one behavior, and
wherein said function for generating at least one behavior takes into account the system constraints of said robot.

15. The humanoid robot of claim 13,
wherein said function selected from the group of functions is said function for generating at least one emotion, and
wherein said function for generating at least one emotion is capable of generating a series of predefined expressions between a neutral state and a predefined state in response to input events.

16. The humanoid robot of claim 1,
further comprising a visual recognition module,
wherein said visual recognition module is capable of interpreting at least one sign from said at least one user as a beginning or an end of a dialog sequence.

17. The humanoid robot of claim 3,
wherein said dialog module includes a submodule for lexical analysis and a submodule for interpreting the outputs of said lexical analysis submodule capable of generating concepts to which the words of the current dialog are linked.

18. The humanoid robot of claim 1,
wherein said dialog module is capable of processing questions and commands from said at least one user relating to the state of the physical and/or logical system of same.

19. A method of dialog between a humanoid robot and at least one user, including:
i) at least one step of recognizing inputs originating from at least one sensor selected from a group including audio sensors and visual sensors of events generated by said at least one user,
ii) a step of generating events to said at least one user, and,
iii) a step of dialog with said dialog with said at least one user, said dialog step receiving as input outputs from said at least one recognition step and producing outputs to said step of generating events selected from a group including speech, movements, expressions and emotions, wherein said method further includes a step of controlling the outputs of the event generation module via an artificial intelligence engine according to a context of dialog and variables defining emotions of the robot and as a series of expressions between a neutral state and a terminal state, an evolution between said neutral state and said terminal state being triggered by a pulse generated as a function of time and of one or more of the outputs of the at least a sensor, the event recognition module, the dialog module and the event generation module.

20. The dialog method of claim 19,
wherein variables defining the one or more of resources available to the robot or system constraints applied to the robot include battery level and temperature of said robot.

21. The dialog method of claim 19,
wherein said robot holds a dialog with at least two users, parameters characterizing said at least two users being stored in a memory of said robot for being used when said robot recognizes one of the at least two users.

22. A computer program embedded in a humanoid robot including program code instructions suitable, when executed on a computer, for managing a dialog between said humanoid robot and at least a user, said computer program including:
i) at least one module for recognizing events at the output of at least one sensor selected from a group including audio sensors and visual sensors of events generated by said at least one user,
ii) at least one module for generating events to said at least one user, and,
iii) a module for dialog with said at least one user, said dialog module receiving as input outputs from said at least one recognition module and producing outputs to said module for generating events selected from a group including speech, movements, expressions and emotions, said program being characterized in that it further includes an artificial intelligence engine configured for controlling the outputs of the event generation module according to a context of dialog and variables defining a configuration of the robot as a series of expressions between a neutral state and a terminal state, an evolution between said neutral state and said terminal state being triggered by a pulse generated as a function of time and of one or more of the outputs of the at least a sensor, the event recognition module, the dialog module and the event generation module.

23. A computer program of claim 22,
wherein the computer code instructions have been generated on a ChatScript type interface.

24. The humanoid robot of claim 1, wherein the series of expressions tends to the neutral state over a defined period of time.

25. The humanoid robot of claim 1, wherein the variables further define one or more of resources available to the robot or system constraints applied to the robot.

26. The humanoid robot of claim 25,
wherein the variables defining the one or more of resources available to the robot or system constraints applied to the robot include battery level and temperature of said robot.

* * * * *